(12) United States Patent
Cöl

(10) Patent No.: US 8,607,421 B2
(45) Date of Patent: Dec. 17, 2013

(54) CLAMP FITTING FOR A HOSE END

(75) Inventor: Isa Cöl, Frankfurt (DE)

(73) Assignee: Veritas AG, Gelnhausen (DE)

( * ) Notice: Subject to any disclaimer, the term of this patent is extended or adjusted under 35 U.S.C. 154(b) by 636 days.

(21) Appl. No.: 12/918,859

(22) PCT Filed: Feb. 24, 2009

(86) PCT No.: PCT/EP2009/052162
§ 371 (c)(1),
(2), (4) Date: Sep. 28, 2010

(87) PCT Pub. No.: WO2009/109484
PCT Pub. Date: Sep. 11, 2009

(65) Prior Publication Data
US 2011/0005040 A1    Jan. 13, 2011

(30) Foreign Application Priority Data

Mar. 7, 2008    (DE) .......................... 10 2008 013 207

(51) Int. Cl.
*F16B 33/08* (2006.01)
*F16B 33/02* (2006.01)
(52) U.S. Cl.
USPC .............................. 24/279; 24/274 R; 285/23
(58) Field of Classification Search
USPC .......... 24/274 R, 278, 282, 279; 285/23, 253, 285/283
See application file for complete search history.

(56) References Cited

U.S. PATENT DOCUMENTS

| 3,407,448 | A | 10/1968 | Tetzlaff et al. | |
| 3,454,996 | A | 7/1969 | Tetzlaff et al. | |
| 3,477,106 | A | 11/1969 | Tetzlaff et al. | |
| 7,761,962 | B2 * | 7/2010 | Krauss et al. | 24/279 |
| 2004/0207195 | A1 * | 10/2004 | Bowater | 285/23 |
| 2007/0018063 | A1 * | 1/2007 | Lange et al. | 248/226.11 |
| 2008/0098572 | A1 | 5/2008 | Krauss | |
| 2008/0098575 | A1 * | 5/2008 | Krauss et al. | 24/279 |

FOREIGN PATENT DOCUMENTS

| DE | 10324236 A1 | 8/2004 |
| DE | 202005011542 | 10/2005 |
| DE | 102006048344 A1 | 4/2008 |
| EP | 1912007 A2 | 4/2008 |
| EP | 2017518 A1 | 1/2009 |
| WO | WO 2008/022853 A1 | 2/2008 |

* cited by examiner

*Primary Examiner* — Robert J Sandy
(74) *Attorney, Agent, or Firm* — Law Offices of Peter H. Priest, PLLC

(57) ABSTRACT

A clamp fitting (1) for a hose end (80) is described which employs a hose clamp (2) and at least one support element (4). The support element (4) includes a substantially U-shaped section in which the hose source (2) is held. An extension section (10) is located at this U-shaped section, said extension section including at least one engagement element (14, 15). The end of the at least one engagement element (14, 15) has sharp edges. The ends can also be designed in pointed fashion. If the clamp fitting is attached to a hose, the engagement elements penetrate the hose by way of these ends. This arrangement prevents further slipping of the clamp fitting attached to the hose.

18 Claims, 8 Drawing Sheets

CLAMP FITTING FOR A HOSE END

Figure 1:
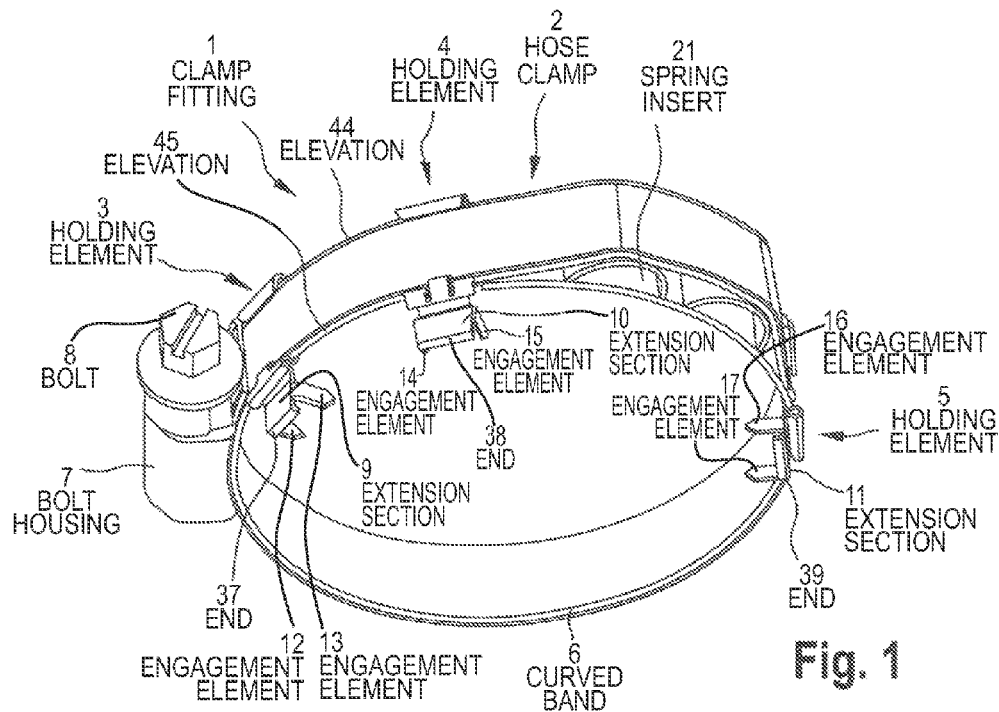

The invention relates to a clamp fitting for a hose end according to the preamble of patent claim 1.

Hose clamps serve as clamping systems for hose ends, which are applied onto the circumference of a hose in order to connect the hose end with a pipe connection over which the hose had previously been pushed. In order for the hose clamp not to become detached from the hose end, additional holding elements are frequently attached on the hose clamp.

Known is a clamping system for a hose end which comprises a hose clamp including at least at one point a deadlock part extending transversely to the circumference of the hose end, which part engages into the inner side of the hose end (DE 103 24 236 A1).

There is furthermore a clamp fitting known in which a clamp is connected with a holding element (U.S. Pat. Nos. 3,454,996; 3,477,106). The holding element is connected with the underside of the clamp and includes engagement elements with which it can be connected with the hose end such that the clamp can be securely disposed at a certain location of the hose.

Lastly, a hose clamp is known with a clamp band, a tensioning device and a positioning arrangement, which includes at least one positioner with a base and a claw that can be pressed into a hose wall (DE 10 2006 048 344 A1). The claw includes a section inwardly projecting from the base into the press-in direction, wherein the claw has an end that forms an obtuse angle with the section.

The present invention addresses the problem of providing a clamp fitting for a hose clamp which is implemented such that a slipping of the hose clamp disposed on a hose is not possible.

This problem is resolved through the features of claim 1.

The invention consequently concerns a clamp fitting for a hose end, comprised of a hose clamp and at least one holding element. The holding element includes a substantially U-shaped section in which the hose clamp is supported. On this U-shaped section is disposed an extension section which includes at least one engagement element. This at least one engagement element has sharp edges at its end. The ends can also be pointed. When the clamp fitting is attached on a hose, the engagement elements penetrate into the hose by means of these ends. Slipping of the clamp fitting attached on the hose is therewith no longer possible.

Figure 2:
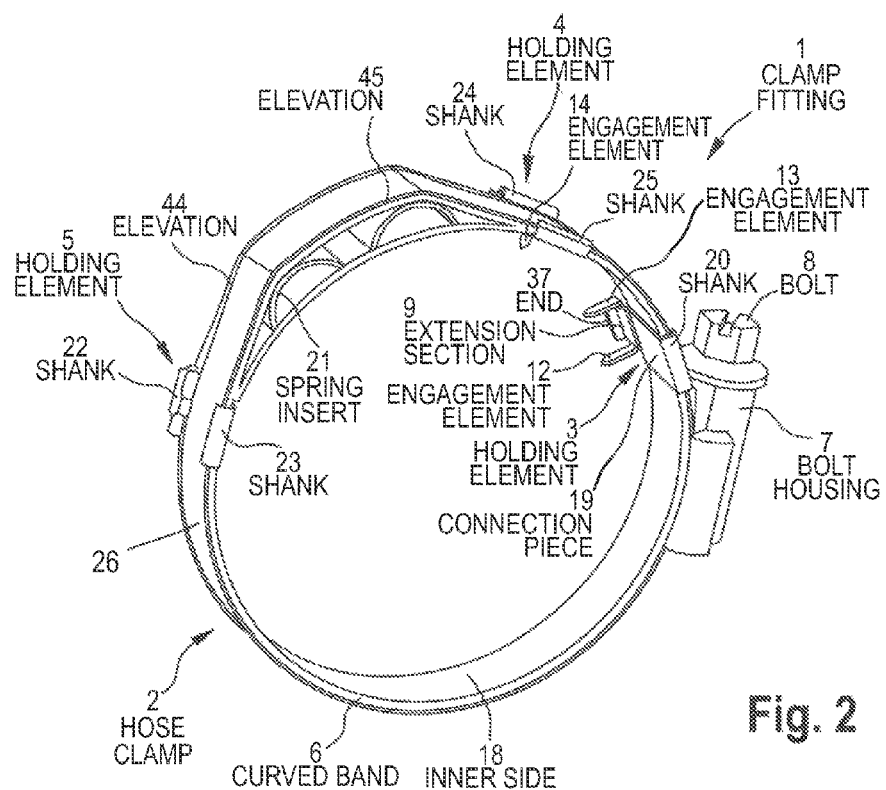
Figure 3A:
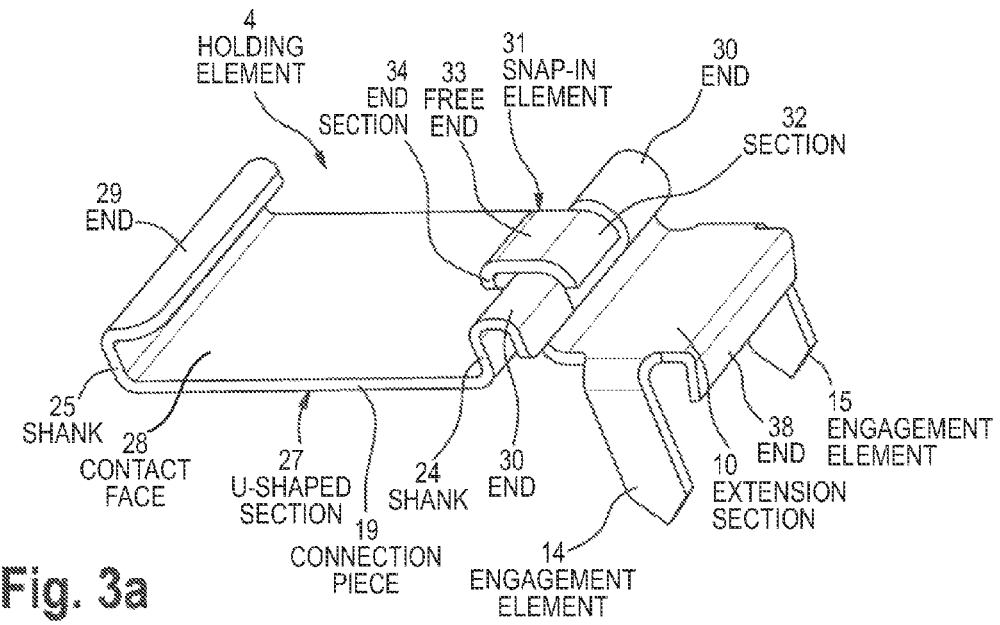
Figure 3B:
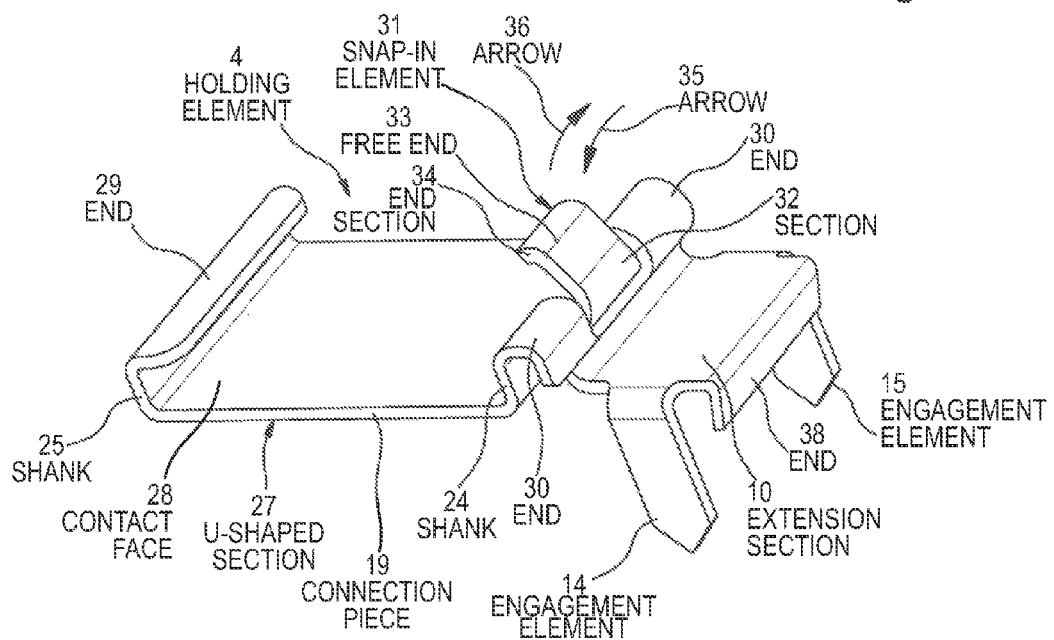
Figure 3C:
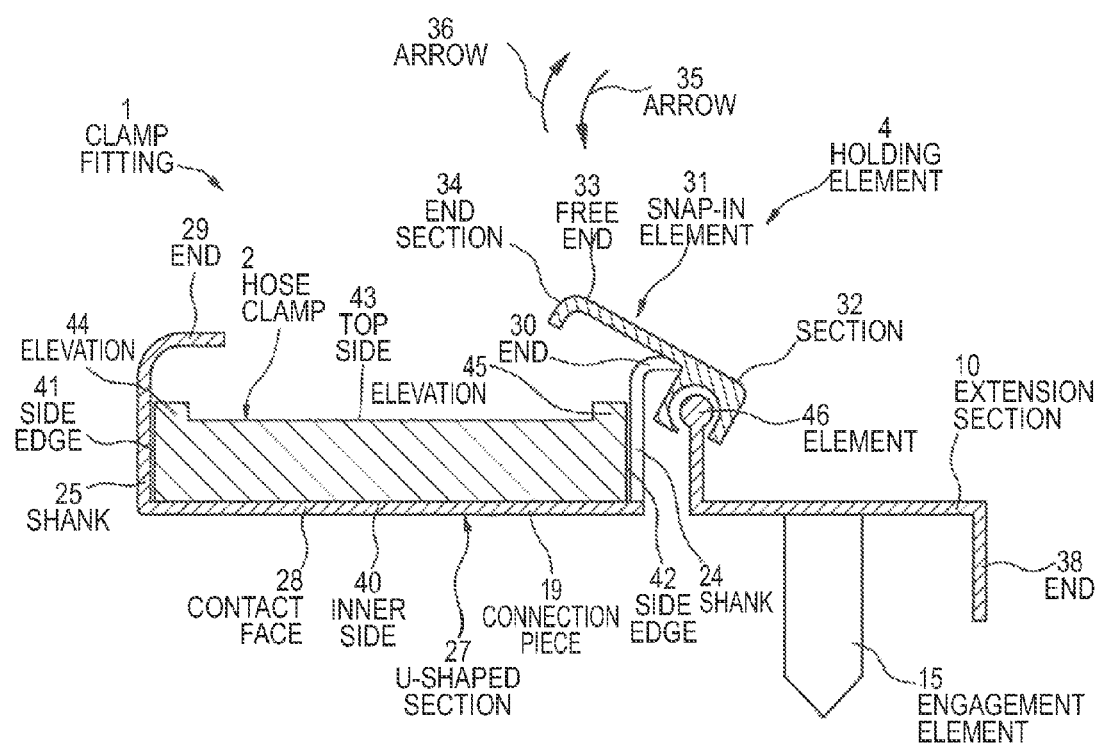
Figure 4:
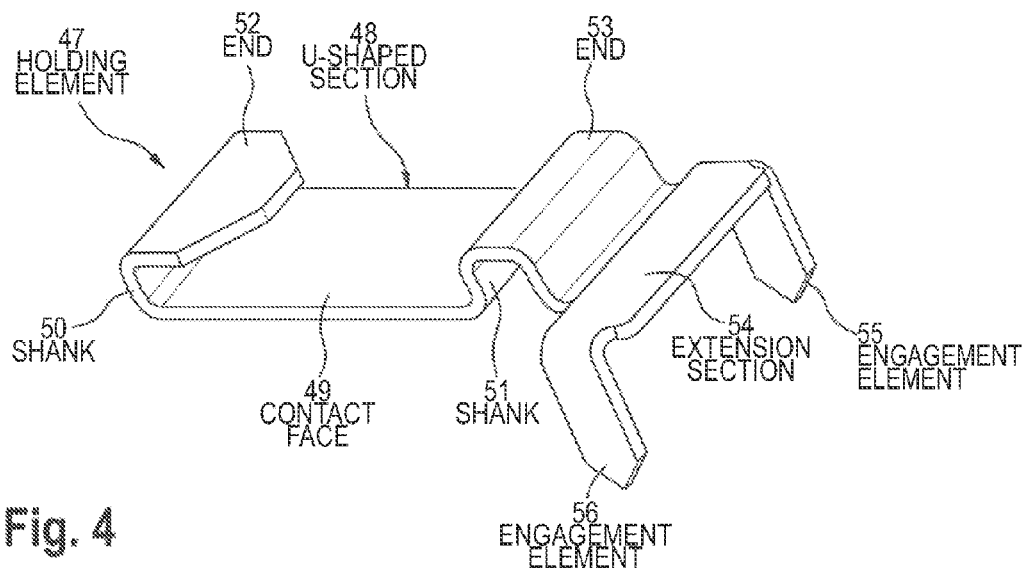
Figure 5:
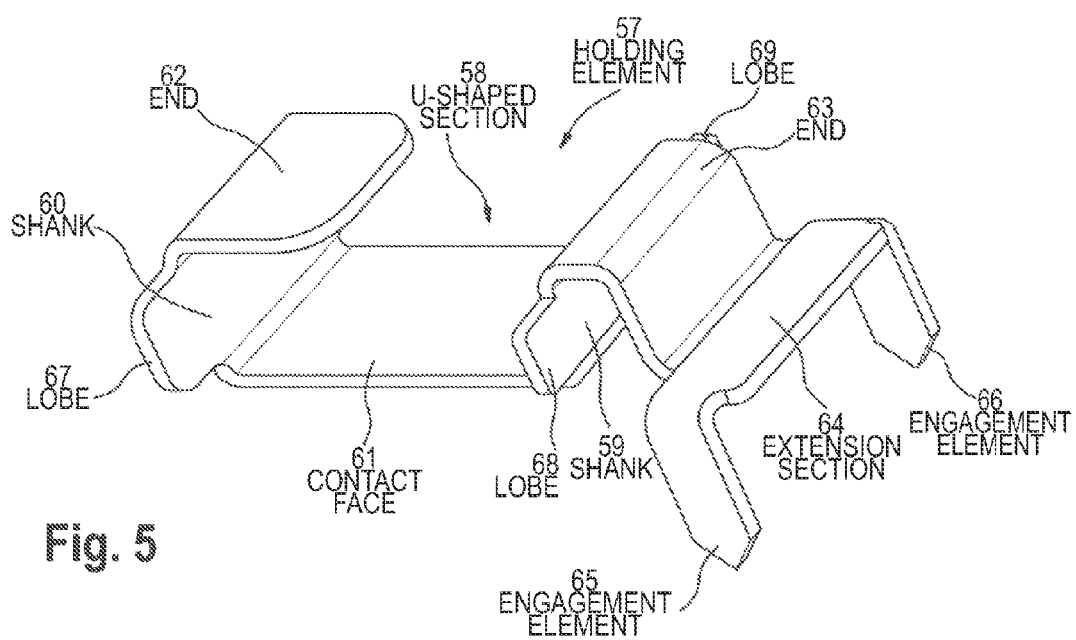
Figure 6:
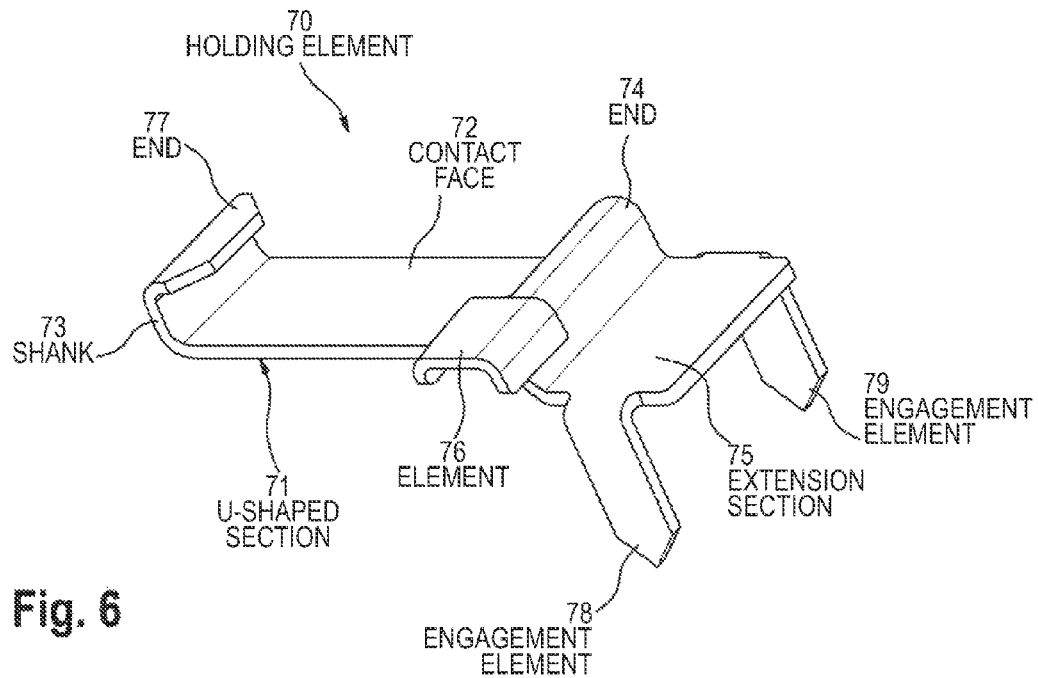
Figure 7:
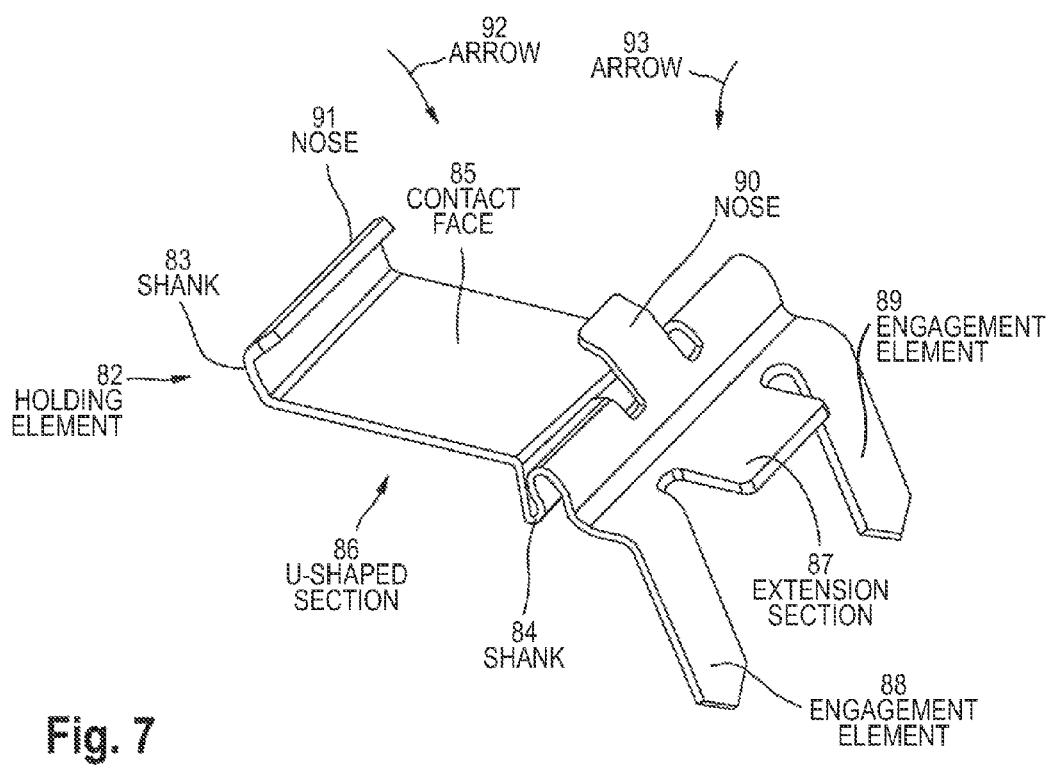
Figure 8A:
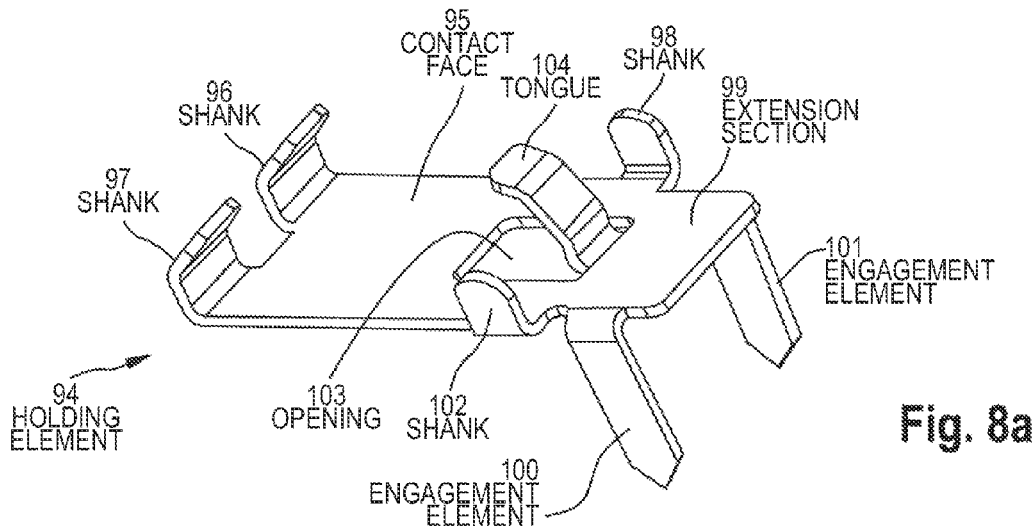
Figure 8B:
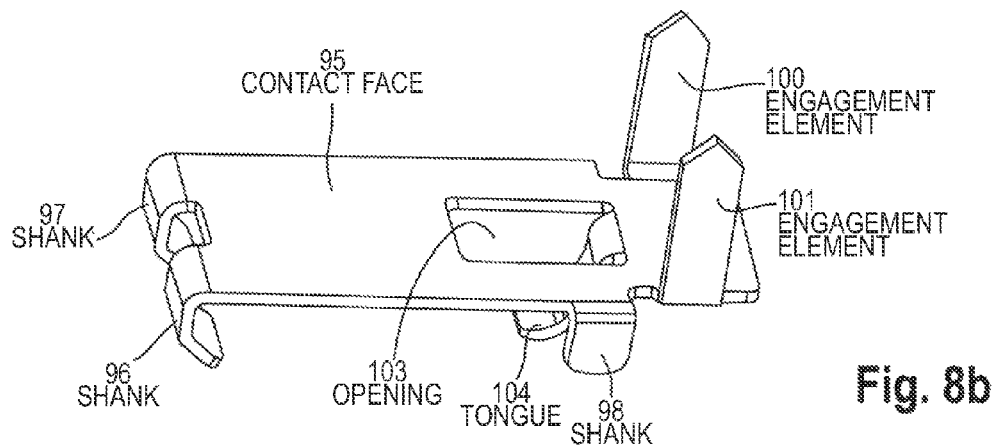
Figure 8C:
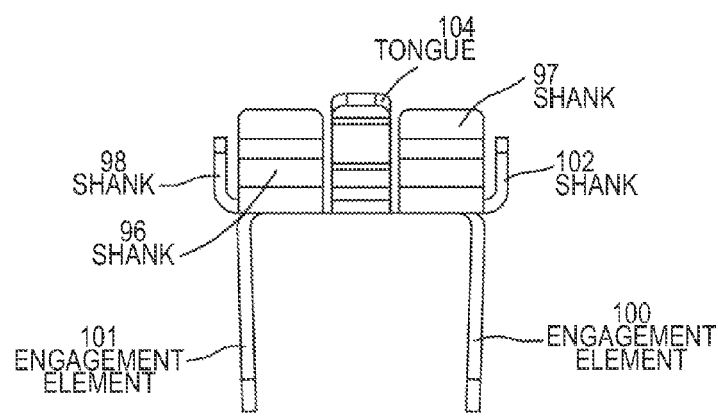
Figure 9:
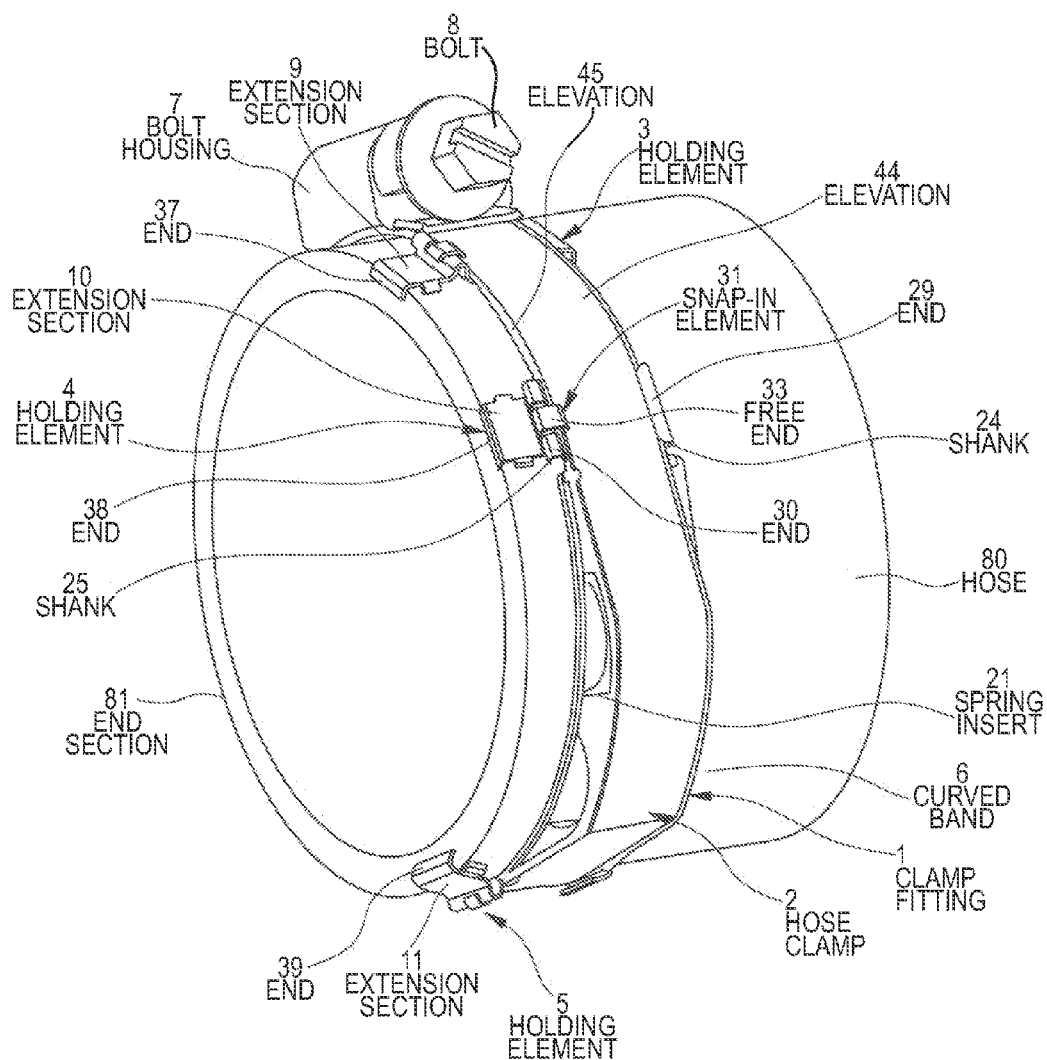
Figure 10:
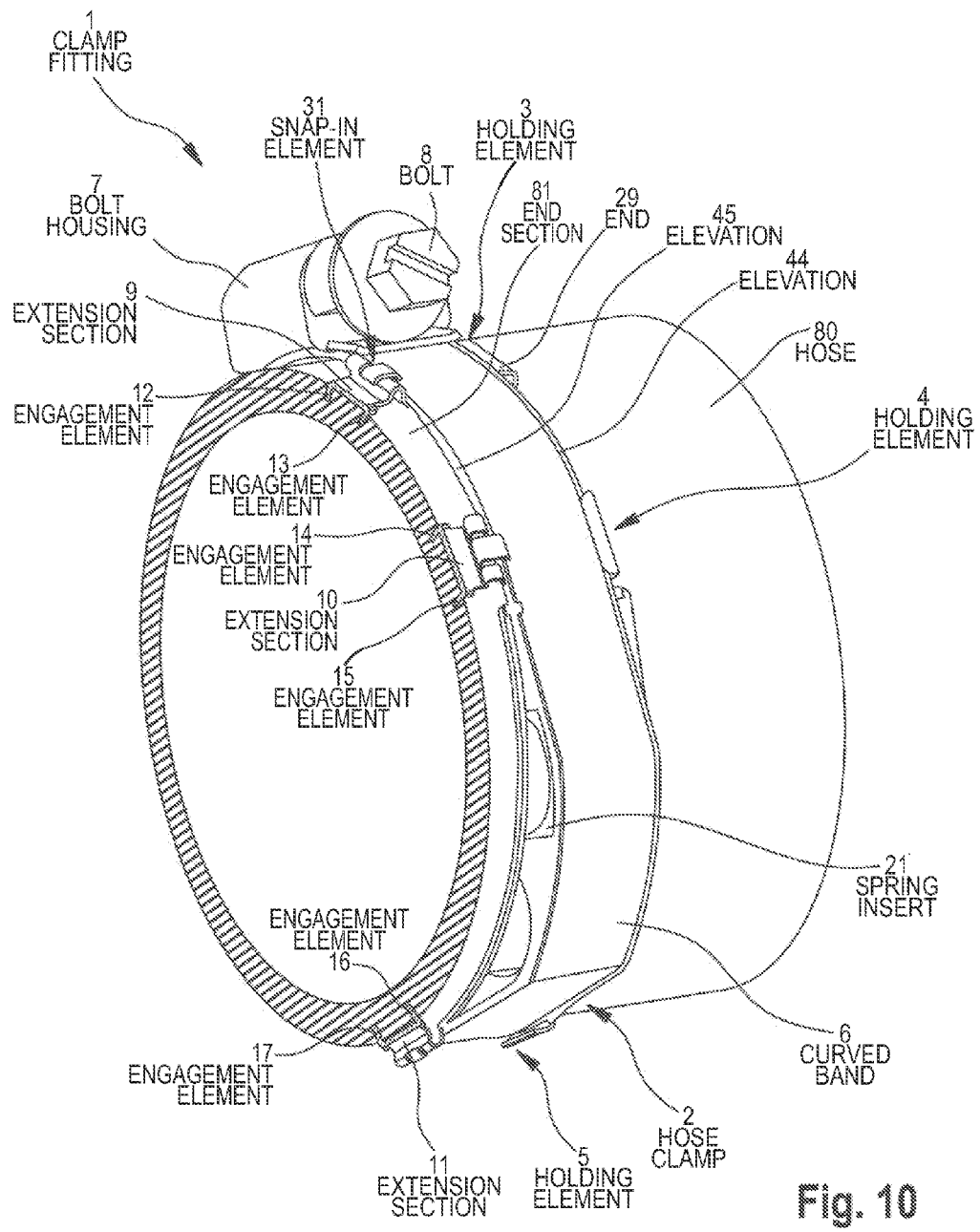

Embodiment examples of the invention are shown in the drawing and will be described in the following in further detail. In the drawing depict:

FIG. 1 a clamp fitting without hose,

FIG. 2 the clamp fitting shown in FIG. 1 in a different position,

FIG. 3a a holding element of the clamp fitting shown in FIGS. 1 and 2 without hose clamp, FIG. 3b the holding element depicted in FIG. 3a in a different function, FIG. 3c a section through the holding element shown in FIG. 3a, 3b, FIG. 4 a second variant of a holding element, FIG. 5 a third variant of a holding element, FIG. 6 a fourth variant of a holding element, FIG. 7 a fifth variant of a holding element, FIG. 8a a sixth variant of a holding element in perspective view from above;

FIG. 8b the variant of the FIG. 8a in perspective view from below,

FIG. 8c the variant of FIG. 8a in view onto the narrow side,

FIG. 9 the clamp fitting according to FIG. 1 after mounting on a hose,

FIG. 10 the sliced-[view] clamp fitting according to FIG. 9 after mounting on the hose.

FIG. 1 shows a clamp fitting 1, comprised of a hose clamp 2 as well as holding elements 3 to 5. The hose clamp 2 is a curved band 6 with integrated spring insert 21. The hose clamp 2 comprises a threaded housing 7 with a bolt 8. With this bolt 8 the circumference of the band 6 can be varied. Evident are also elevations 44, 45, which are disposed in the margin region of the band 6. The clamp fitting 1 is herein comprised of a corrosion resistant material, for example high grade steel.

The holding elements 3 to 5 include plate-shaped extension sections 9 to 11. These extension sections 9 to 11 are recurved at their ends 37 to 39 such that these ends 37 to 39 can at least partially encompass an end section of a hose. Such a recurved end is disclosed for example in U.S. Pat. No. 3,454,996 or DE 103 24 236 A1. It is also feasible for the arcuate ends 37 to 39 have engagement elements, as is disclosed in U.S. Pat. No. 3,454,996. These engagement elements additionally engage into the end section of the hose. However, FIG. 1 does not show a hose.

On each of these extension sections 9 to 11 are disposed two engagement elements 12 to 17. As is evident in FIG. 1, these engagement elements 12 to 17 are tapered toward their end. It is, however, also feasible for the engagement elements 12 to 17 to have sharp edges at their ends.

Although the holding elements 3 to 5 in FIG. 1 have two engagement elements 12 to 17, a holding element can also comprise only one engagement element or also more than only two engagement elements.

FIG. 2 depicts the clamp fitting 1 shown in FIG. 1 after a rotation. Evident are again the holding elements 3 to 5 disposed on the hose clamp 2. The holding element 3 is herein disposed on the inner side 18 of the hose clamp 2. The hose clamp 2 is in contact on a contact face of a connection piece 19 of the holding element 3. The connection piece 19 is disposed between two shanks perpendicular on the contact face, wherein in FIG. 2 only shank 20 is visible. The shanks and the contact face thus form a substantially U-shaped section of the holding element 3. The other two holding elements 4, 5 are located on both sides of the integrated spring insert 21. These holding elements 4 and 5 also include two shanks 22, 23; 24, 25 of a substantially U-shaped section.

The shanks 22, 23; 24, 25 of holding elements 4, 5 are located opposite one another. Although in FIG. 2 the clamp fitting 1 is comprised of holding elements 3 to 5 and a hose clamp 2 with an integrated spring insert 21, it is obvious to a person of skill in the art that for such a clamp fitting other hose clamps can also be utilized.

FIG. 3a shows the holding element 4 depicted in FIGS. 1 and 2 without hose clamp. This holding element 4 includes a substantially U-shaped section 27 with the two oppositely located shanks 24, 25. The two shanks 24, 25 are connected with one another via the connection piece 19. By 28 is herein denoted the contact face for a hose clamp. The two shanks 24, 25 include two U- or L-shaped, respectively, arcuate ends 29, 30. The end 29 of shank 25 is herein formed such that it at least partially overlaps the contact face 28 and, in particular, parallel thereto.

The end 30 of shank 24 of the substantially U-shaped section 27 is also arcuate. However, it does not overlap the contact face 28, but rather connects the extension section 10 with the substantially U-shaped section 27.

The extension section 10 can thus be viewed as an extension of the contact face 28, wherein the contact face 28 is connected with the extension section 10 via the end 30 of shank 24.

As is evident in FIG. 3*a*, the end 30 is discontinuous in the center. Here a movable snap-in element 31 is disposed. This snap-in element 31 is movably disposed with a section 32 on the arcuate end 30 of shank 24. The snap-in element 31 has a free end 33 which at least partially overlaps the contact face 28 at a clearance spacing. At the free end 33 is herein disposed an end section 34, which is arcuate toward the contact face 28 such that the end section 34 of the free end 33 is oriented in the direction toward the contact face 28.

FIG. 3*b* shows a view of the holding element 4 depicted in FIG. 3*a*, wherein the snap-in element 31 has been moved in the direction of arrow 36. The free end 33 is hereby no longer oriented parallel to the contact face 28. A hose clamp, not shown here, can thus be introduced into the U-shaped section 27 of the holding element 4, wherein it must be observed that the hose clamp comes to rest with its inner side on the contact face 28. The snap-in element 31 can subsequently be moved in the direction of arrow 35 until it snaps in. Therewith the holding element 4 is securely connected with the hose clamp.

FIG. 3*c* shows a section through the clamp fitting 1 depicted in FIG. 1 or a section through the clamp fitting according to FIG. 3*b*, wherein in the U-shaped section 27 the hose clamp 2 is disposed. As is evident in FIG. 3*c*, the hose clamp 2 comprises at the side edges 41, 42 elevations 44, 45. The hose clamp 2 herein is with its inner side 40 in contact on the contact face 28 of the U-shaped section 27 of the holding element 4.

The shanks 24, 25 of the U-shaped section 27 encompass the side edges 41, 42 with the elevations 44, 45 disposed thereon. The end 29 of the shank 25 further overlaps at a spacing the elevation 44 as well as at least partially the top side 43 of the hose clamp 2.

The snap-in element 31 is movably disposed on an element 46 located on the extension section 10. The element 46, which—as depicted in FIG. 3*c*—is implemented in the form of a sphere or cylinder, is disposed within section 32 of the snap-in element 31. The element 46 can also have a different form provided it is ensured that the snap-in element 31 is disposed movably on this element 46. The element 46 additionally comprises a means, not shown here, for example a spring element which ensures that, in the movement in the direction of arrow 35 or in the direction of arrow 36, the snap-in element 31 snaps in upon reaching a previously defined position.

When the snap-in element 31 is moved in the direction of arrow 35, it lastly reaches a lower snap-in position. This snap-in position is preferably distinguished thereby that the free end 33 in this snap-in position is disposed parallel to the contact face 28 and thus also parallel to the top side 43 of the hose clamp 2. Since in this snap-in position the end 29 of shank 25 as well as also the free end 33 of the snap-in element 31 at least partially overlap the top side 43 of the hose clamp 2, the hose clamp 2 is securely disposed in the U-shaped section 27.

FIG. 4 depicts a second variant of a holding element 47. This holding element 47 comprises again a substantially U-shaped section 48 with a contact face 49 and two shanks 50, 51. On each of the two shanks 50, 51 is disposed an arcuate end 52, 53, wherein end 52 is implemented in the form of a trapezoid. The end 53 connects the U-shaped section 48 with an extension section 54, which comprises two engagement elements 55, 56. As is evident in FIG. 4, the end 53 is not discontinuous. A snap-in element is consequently not provided in this holding element 47, wherewith this variant of the holding element 47 is structured more simply compared to holding element 4.

FIG. 5 depicts a third variant of a holding element 57. This holding element 57 also comprises a substantially U-shaped section 58 with two shanks 59, 60 with a contact face 61 disposed between the shanks 59, 60. The two shanks 59, 60 are provided with ends 62, 63, which are also arcuate. The end 62 is herein disposed parallel and at a spacing to the contact face 61. The end 63 connects an extension section 64 with the U-shaped section 58.

As is also the case in the other holding elements 4 and 47, two engagement elements 65, 66 are disposed on the extension section 64. The two shanks 59, 60 additionally include lobes, whereby the shanks 59, 60 are extended at their sides. In FIG. 5 only lobes 67 to 69 are evident.

FIG. 6 depicts a further variant of a holding element 70. This holding element 70 includes a substantially U-shaped section 71 comprising a contact face 72 and two shanks disposed thereon, wherein only shank 73 is evident in its entirety. However, the end 74 of the shank opposite to shank 73 is evident, which connects the U-shaped section 71 with an extension section 75. The contact face 72 is herein narrower compared to the extension section 75.

At the extension section 75 can be seen an element 76 extending parallel to the contact face 72, which element is disposed offset with respect to contact face 72 such that it is not disposed above this contact face 72. However, when a hose clamp is disposed in the U-shaped section 71, the element 76 overlaps at least partially the hose clamp. This element 76 can be either fixedly disposed on the extension section 75 or also as a movable snap-in element. However, a hose clamp is not depicted in FIG. 6.

It is understood that the shank 73 can also include an end 77 which is either fixedly disposed on this shank 73 or as a movable snap-in element.

As is the case in the other holding elements 3 to 5, 47, 57, in this holding element 70 also two engagement elements 78, 79 are provided on the extension section 75.

FIG. 7 depicts a fifth variant of a holding element 82. The holding element 82 includes two opposing shanks 83, 84, which are connected with one another across a contact face 85 for a clamp. A clamp is however not shown in FIG. 7. The two shanks 83, 84 as well as the contact face 85 form a substantially U-shaped section 86. The contact face 85 is connected with an extension section 87 across the shank 84.

Adjacent to the extension section 87 are disposed two engagement elements 88, 89. The engagement elements 88, 89 are thus directly connected with shank 84 and not, as is the case in the other variants 3, to 5, 47, 57, 70, with the extension section 87. Although not shown in FIG. 7, the extension section 87 can also include an arcuate end that can at least partially encompass the end of a hose as are included for example in variants 3 and 5.

Evident is also a nose 90 bent at an angle on shank 84. Shank 83 also includes such an angle-bent nose 91. After a hose clamp has been inserted into the substantially U-shaped section 86, these noses 90, 91 be moved in the direction of arrows 92 or 93, e.g. in the direction of the contact face 85 and thus in the direction of the clamp in contact on the contact face. The clamp disposed in the U-shaped section 86 is thereby secured in position.

FIG. 8*a* shows a further variant of a holding element 94, which again includes a contact face 95 for a clamp. A clamp is, however, not shown in FIG. 8*a*. On the contact face 95 are disposed two adjacent and spaced-apart shanks 96, 97. On the side opposite shanks 96, 97 the contact face 95 is adjoined by an extension section 99 on which two engagement elements 100, 101 are disposed that can engage into the end of a hose. A hose is not shown in FIG. 8a. Between the extension section 99 and the contact face 95 are provided two opposing shanks 98, 102 which are disposed at right angles to shanks 96, 97. Between these shanks 98, 102 is provided an opening 103 in the contact face, which is at least partially overlapped by a tongue 104. By folding down this tongue 104 a clamp can be arrested.

FIG. 8b shows once again the holding element 94 in a view from below. Evident is herein that the tongue 104 can be generated by being stamped out of face 95.

FIG. 8c shows a view of the holding element 94 which depicts the sight from the shanks 96, 97 onto the tongue 104.

FIG. 9 depicts the clamp fitting 1 according to FIGS. 1 and 2 after being mounted on a hose 80. This clamp fitting 1 is disposed in the end section 81 of the hose 80. Evident are again the holding elements 3 to 5 disposed on the hose clamp 2. The hose clamp 2 is herein disposed on the contact faces of the holding elements 3 to 5 such that these contact faces of the holding elements 3 to 5 are located between hose 80 and hose clamp 2.

The holding elements 3 to 5 depicted in FIG. 9 are each the same variant as are depicted in FIGS. 3a to 3c.

As can be clearly seen in the case of holding element 4, shanks 24, 25 encompass the side sections 44, 45 of band 6 of the hose clamp 2. The end 29 as well as the free end 33 of the snap-in element 31 at least partially overlap herein the side sections 44, 45 of the hose clamp 2.

Evident are also the extension sections 9 to 11 of holding elements 3 to 5. The engagement elements 12 to 17 disposed on these extension sections 9 to 11 are not evident in FIG. 9 since these are inserted into the end section 81 of hose 80.

Although in FIG. 9 only holding elements 3 to 5 of the same type are utilized, different holding elements can also be utilized for a clamp fitting.

In FIG. 10 the hose 80 and the clamp fitting 1 from FIG. 9 applied on hose 80 are shown in sliced view. The engagement elements 12 to 17 disposed on the extension sections 9 to 11 of holding elements 3 to 5 are exposed. These engagement elements 12 to 17 are pressed into the hose end 81 of hose 80. Slipping of the clamp fitting 1 is no longer possible.

If the hose 80 is to be attached on a pipe connection, not shown here, the sequence can be as follows:

Applying at least one holding element 3 to 5 on the underside of hose clamp 2.

Inserting the end section 81 of the hose 80 into the clamp fitting 1.

Applying the hose 80 on the pipe connection by pushing it over the pipe connection.

Finding the desired position of the clamp fitting 1 on the hose surface.

Tightening the bolt 8 of hose clamp 2, whereby the circumference of the clamp 2 is decreased and the engagement elements 12 to 17 are pressed into the hose 80.

The holding elements 3 to 5 therewith form a secure connection with the hose 80 via the engagement elements 12 to 17. When using the clamp fitting 1 the hose end 81 does not need to be of a particular form. It is consequently not necessary that the hose end 81 has a rough surface. Through the clamp fitting 1 with the holding elements 3 to 5, which comprise the engagement elements 12 to 17, hoses with a smooth surface can also be selected, since through the clamp fitting the hose can be applied securely on the pipe connection.

When applying the clamp fitting 1 on the hose 80 it is advantageous that the former can be prefixed axially as well as also radially. Through this prefixing the mounting time during the application of the hose 80 on the pipe connection can be markedly shortened. Slipping of the hose from the pipe connection is therewith no longer possible. Hoses with prefixed clamp fittings can thus be directly transported to that site at which the hoses are to be mounted on pipe connections. The hoses can subsequently on site be disposed securely on the pipe connection via the clamp fitting. This mounting takes place with special tools provided for fixing the clamps.

The radial fixing takes place thereby that, for example, a holding element is attached in the proximity of the housing for the bolt 8 and/or in the proximity of springs 6, 21. If the clamp is subsequently turned [out of position], for example relative to the hose 80, the holding element pushes the spring or the springs against the holding element such that a further turning is prevented.

It is understood that the parts 37, 25 can be omitted since the engagement elements 12, 13 ensure sufficient securement. The engagement elements 12, 13 can also be longer than depicted in FIG. 10 and penetrate, for example, the entire thickness of the hose. Parts of the engagement elements 12, 13 possibly projecting on the inner side of the hose can in this case be flattened down with special devices.

The above describe clamp fitting has the following advantages:

Precise positioning of the clamp on the hose is made possible.

The hose and the pipe connection over which it is pushed can be securely connected with one another via the clamp fitting.

the clamp fitting is corrosion resistant.

The clamp fitting is structured compactly; it can thus be stored saving space.

The clamp fitting is comprised of only a few parts which cover a multiplicity of applications.

A hose can be applied on a pipe connection by means of the pre-assembled clamp fitting in a very short time.

At the connection site between hose and pipe connection no leaking points are formed.

Although the embodiment examples of the invention have been described above in detail, the invention is not limited to these embodiment examples. A person of skill in the art understands that the invention comprises diverse variants with which the same result is achieved as with the embodiment examples described here. It is therefore evident for the person of skill in the art that with the embodiment examples described here the scope of the protection of the claims is not restricted and that there are further variants, modifications and alternatives which fall within the protective scope of the claims.

The invention claimed is:

1. Clamp fitting (1) for a hose end with at least one holding element (3-5, 47, 57, 70, 82, 94), characterized in that the holding element (3-5, 47, 57, 70, 82, 94) includes a contact face (28, 49, 61, 72, 95) for a hose clamp (2) and at least one upwardly directed shank (20; 22, 23; 24, 25; 50, 51; 59, 60; 73; 83, 84; 96, 97) and that the holding element (3-5, 47, 57, 70, 82, 94) includes an extension section (9-11, 54, 64, 75, 87, 99) as well as at least one engagement element (12, 13; 14, 15; 16, 17; 55, 56; 65, 66; 88, 89; 100, 101), characterized in that the engagement elements (88, 89) are located on one of the shanks (83, 84).

2. Clamp fitting as claimed in claim 1, characterized in that the contact face (28, 49, 61, 72, 95) includes two oppositely located shanks (20; 22, 23; 24, 25; 50, 51; 59, 60; 73; 83, 84) which form a substantially U-shaped section (27, 48, 58, 71, 86) for receiving the hose clamp (2).

3. Clamp fitting as claimed in claim 2, characterized in that the hose clamp (2) is in contact with its inner side (40) on the contact face (28, 49, 61, 72, 85, 95) of the holding element (3-5, 47, 57, 70, 82, 94) and that the ends (29, 52, 62, 77) of the shanks at least partially encompass the top side (43) of the hose clamp (2).

4. Clamp fitting as claimed in claim 1, characterized in that at least one of the shanks (20; 22, 23; 24, 25; 50, 51; 59, 60; 73; 83, 84; 96, 97) has an end (29, 52, 62, 77) disposed substantially parallel to the contact face (28, 49, 61, 72, 95) of the holding element (3-5, 47, 57, 70, 94) and at least partially overlaps the contact face (28, 49, 61, 72, 95).

5. Clamp fitting as claimed in claim 4, characterized in that the end (98) completely overlaps the contact face (95).

6. Clamp fitting as claimed in claim 5, characterized in that the end (98) includes an end section (102) which is arcuate in the direction toward the contact face (95).

7. Clamp fitting as claimed in claim 4, characterized in that the hose clamp (2) is in contact with its inner side (40) on the contact face (28, 49, 61, 72, 85, 95) of the holding element (3-5, 47, 57, 70, 82, 94) and that the ends (29, 52, 62, 77) of the shanks at least partially encompass the top side (43) of the hose clamp (2).

8. Clamp fitting as claimed in claim 1, characterized in that the hose clamp (2) is in contact with its inner side (40) on the contact face (28, 49, 61, 72, 85, 95) of the holding element (3-5, 47, 57, 70, 82, 94) and that the ends (29, 52, 62, 77) of the shanks at least partially encompass the top side (43) of the hose clamp (2).

9. Clamp fitting as claimed in claim 1, characterized in that the extension section (9-11, 54, 64, 75, 87) is connected with the contact face (28, 49, 61, 72, 85) via one of the shanks (20; 22, 23; 24, 25; 50, 51; 59, 60; 73; 83, 84).

10. Clamp fitting as claimed in claim 1, characterized in that the engagement elements (12, 13; 14, 15; 16, 17; 55, 56; 65, 66; 88, 89; 100, 101) are oppositely directed with respect to the shanks (20; 22, 23; 24, 25; 50, 51; 59, 60; 73; 83, 84; 96, 97) whereby the engagement elements (12, 13; 14, 15; 16, 17; 55, 56; 65, 66; 88, 89; 100, 101) can penetrate into the hose (80).

11. Clamp fitting as claimed in claim 10, characterized in that the engagement elements (12, 13; 14, 15; 16, 17; 55, 56; 65, 66; 88, 89; 100, 101) have pointed or sharp ends.

12. Clamp fitting as claimed in claim 1, characterized in that the extension section (9-11, 54, 64, 75, 87, 99) includes an end (37-39) extending substantially parallel to the engagement elements (12, 13; 14, 15; 16, 17; 55, 56; 65, 66; 88, 89; 100, 101) and, with respect to the shanks (20; 22, 23; 24, 25; 50, 51; 59, 60; 73; 83, 84), in the opposite direction, which end at least partially encompasses the end of the hose (80).

13. Clamp fitting as claimed in claim 1, characterized in that the engagement elements (12, 13; 14, 15; 16, 17; 55, 56; 65, 66; 100, 101) are located on the extension section (9-11, 54, 64, 75, 99).

14. Clamp fitting as claimed in claim 1, characterized in that the extension section (99) adjoins the contact face (95).

15. Clamp fitting (1) for a hose end with at least one holding element (3-5, 47, 57, 70, 82, 94), characterized in that the holding element (3-5, 47, 57, 70, 82, 94) includes a contact face (28, 49, 61, 72, 95) for a hose clamp (2) and at least one upwardly directed shank (20; 22, 23; 24, 25; 50, 51; 59, 60; 73; 83, 84; 96, 97) and that the holding element (3-5, 47, 57, 70, 82, 94) includes an extension section (9-11, 54, 64, 75, 87, 99) as well as at least one engagement element (12, 13; 14, 15; 16, 17; 55, 56; 65, 66; 88, 89; 100, 101), characterized in that the holding element (3-5) includes at least one movable snap-in element (31) which is disposed on one of the shanks (20; 22, 23; 24, 25; 50, 51; 59, 60; 73).

16. Clamp fitting as claimed in claim 15, characterized in that the snap-in element (31) includes a free end (33) which can be disposed on the top side (43) of the hose clamp (2).

17. Clamp fitting (1) for a hose end with at least one holding element (3-5, 47, 57, 70, 82, 94), characterized in that the holding element (3-5, 47, 57, 70, 82, 94) includes a contact face (28, 49, 61, 72, 95) for a hose clamp (2) and at least one upwardly directed shank (20; 22, 23; 24, 25; 50, 51; 59, 60; 73; 83, 84; 96, 97) and that the holding element (3-5, 47, 57, 70, 82, 94) includes an extension section (9-11, 54, 64, 75, 87, 99) as well as at least one engagement element (12, 13; 14, 15; 16, 17; 55, 56; 65, 66; 88, 89; 100, 101), characterized in that four upwardly directed shanks (96, 97; 98, 102) are provided, of which two shanks (98, 102) are oriented perpendicularly to the two other shanks (96, 97).

18. Clamp fitting as claimed in claim 17, characterized in that between two shanks (98, 102) an opening (103) in the contact face (95) is provided, wherein the opening (103) is at least partially overlapped by a tongue (104).

* * * * *